UNITED STATES PATENT OFFICE 2,683,755

METHOD OF CONDUCTING HYDROCARBON REACTIONS

Robert M. Kennedy, Newtown Square, and Abraham Schneider, Philadelphia, Pa., assignors to Sun Oil Company, Philadelphia, Pa., a corporation of New Jersey No Drawing. Application June 11, 1951,
Serial No. 231,056

13 Claims. (Cl. 260—666)

This invention relates to reactions involving olefins, cycloalkyl fluorides, boron trifluoride and an alkyl substituted cyclopentane or an isoparaffin, and is particularly directed to a method of reacting olefins with cycloalkyl fluorides.

In an application for Letters Patent of the United States filed July 10, 1948 (Serial No. 38,167), now Patent No. 2,557,113, there is described and claimed reactions of isoparaffins and olefins catalyzed by the combination of $BF_3$ and an alkyl fluoride. In application Serial No. 86,526, filed April 9, 1949, now Patent No. 2,557,115, there is described and claimed the alkylation of isobutane with isobutylene catalyzed by $BF_3$ and an alkyl fluoride to form 2,2,4-trimethylpentane.

It has now been discovered that by bringing together a cycloalkyl fluoride and $BF_3$ in the presence of an olefin and a cyclopentane having at least 1 alkyl substituent and at least 1 tertiary hydrogen atom, or an isoparaffin having at least 1 tertiary hydrogen atom, a catalytic condition effective to cause the cycloalkyl fluoride and the olefin to react to form an alkyl substituted cyclohexane having an alkyl substituent containing the same number of carbon atoms as the olefin is established. In the reaction, the alkyl cyclopentane or isoparaffin serves as a hydrogen donor to saturate an intermediate to form the alkylated cyclohexane product, and in turn dimerizes, the dimer of the cyclopentane being an alkyl substituted decalin, and the dimer of the isoparaffin, if used, being a branched chain paraffin. In the absence of a hydrogen donor, as described, the present process does not occur, and instead a high molecular weight material having a wide boiling range is formed. It is a characteristic of the present process that a small portion of the cyclic fluoride is converted to the corresponding naphthene.

To illustrate the process of the present invention, on contacting cyclohexyl fluoride and $BF_3$ in the presence of methylcyclopentane and butene-2, there are formed in substantial yields 2-cyclohexylbutane, dimethyldecalin, and cyclohexane. A small quantity of a higher boiling material, largely dimethyldecalin alkylated with the olefin, is also formed.

In bringing together the cyclic fluoride and $BF_3$, the $BF_3$ can be introduced into an admixture of the cyclopentane, olefin, and cyclic fluoride, or the cyclic fluoride and $BF_3$ can be introduced simultaneously but separately into a mixture of the cyclopentane and olefin. It is also permissible first to dissolve the cyclic fluoride and $BF_3$ in separate portions of the reactants and then bring together the separate portions to effect reaction. However, operation should be such as to avoid contact between the $BF_3$ and olefin in the absence of the other components, since in such case the olefin may undergo polymerization. Also it is not permissible to premix the cyclic fluoride and $BF_3$ and then add the mixture to the other components, for in such case the catalytic condition will be immediately spent when the cyclic fluoride and $BF_3$ are brought into contact with each other. The present reaction is not observed on the separate addition of the cyclic fluoride or $BF_3$ to the admixture of reactants, or to either component thereof, but on contacting $BF_3$ with the olefin polymerization will be observed. It is only when the cyclic fluoride and $BF_3$ are brought together in the presence of both the alkyl cyclopentane and olefin, as above-described, that the present reaction occurs. It appears that the catalytic effect is produced by extraction of the fluorine atom from the cyclic fluoride by the $BF_3$, resulting in the formation of carbonium ions which initiate and enter the various reactions. The cyclic fluoride thus serves as both a reactant and a catalytic component.

Cycloalkyl fluorides and $BF_3$ are both soluble in the other components and form a homogeneous phase therewith irrespective of their mode of addition, so that reaction does not depend upon contact of separate phases, and hence the mechanical agitation required to provide contact between separate phases is unnecessary. This is a significant advantage over processes involving contact between separate phases, such as hydrocarbon reactions catalyzed by Friedel-Crafts catalysts including for example, aluminum chloride or hydrogen fluoride. It is characteristic of the process of the present invention, that the reaction occurs instantaneously, i. e. the reaction is complete as soon as the components are mixed. This also is a substantial advantage over processes requiring contact between separate phases in that the size of reactors, because of the rapid throughput which is limited only by practical considerations, is reduced to a minimum.

Upon completion of the reaction, the mixture becomes heterogeneous due to separation of a sludge from the hydrocarbon phase. Thus sludge may be conveniently separated by physical methods such as decanting or centrifuging. This material contains fluoride derived from the cyclic fluoride together with $BF_3$ in some sort of complex form. On heating the sludge, $BF_3$ and HF are evolved; the $BF_3$ may be recycled and the HF may be used to prepare additional cycloalkyl fluoride for use in the reaction. The final residue may be discarded or used as a fuel.

The hydrogen donors which may be employed in the present process are preferably naphthenes having a ring composed of 5 carbon atoms and at least 1 tertiary hydrogen atom per molecule, but branched chain paraffins having at least 1 tertiary hydrogen atom may also be employed. For simplicity, the present process is described herein with reference to the use of the preferred alkyl substituted naphthenes, it being understood that isoparaffins, as defined hereinafter, may be substituted therefor.

The naphthenes which may be employed in the present process are the cyclopentanes having from 1 to 3 alkyl substitutents and at least 1 tertiary hydrogen atom attached to a nuclear carbon atom. The total number of carbon atoms of the naphthene may vary from 6 to 30. Methylcyclopentane is a preferred naphthene to employ, as are ethylcyclopentane, propylcyclopentane, and isopropylcyclopentane, and good results are obtained with their homologues and isomers including for example, the various dimethyl, diethyl, methylethyl, methylpropyl, and trimethyl cyclopentanes, and their higher homologues such as hexylcyclopentane, decylcyclopentane, and the like. Mixtures of naphthenes may also be employed, such as those obtainable from petroleum, the $C_6$–$C_{10}$ fraction, for example. Naphthenes having a ring composed of 6 carbon atoms are substantially inert in the reaction of the present process.

By "tertiary hydrogen atom" is meant a hydrogen atom attached to a tertiary carbon atom, i. e., a hydrogen atom which is attached to a carbon atom which is also attached to three other carbon atoms.

The isoparaffins which may be employed in place of the above-described naphthenes are those having at least 1 tertiary hydrogen atom and not more than 30, and preferably not more than 20, carbon atoms per molecule. Relatively low molecular weight isoparaffins, such as isobutane, isopentane, and 2-methylhexane are preferred. The isoparaffin may also be substituted with a naphthene ring, but in such case must have a tertiary hydrogen atom which is not attached to a carbon atom of a 6 carbon atom ring. 1-cyclohexyl-2-methylpropane illustrates this latter type of hydrogen donor which may be employed.

The cycloalkyl fluorides which may be employed in the present process are those having either a 5 carbon atom ring or a 6 carbon atom ring, which are the cyclohexyl fluorides and the cyclopentyl fluorides, including cyclohexyl fluoride and cyclopentyl fluoride and alkyl substituted derivatives thereof, such as 2-methylcyclohexyl fluoride; 3-methylcyclohexyl fluoride; 4-methylcyclohexyl fluoride; 1-methylcyclohexyl fluoride; 1-methylcyclopentyl fluoride; 2-methcyclopentyl fluoride; 1-ethylcyclopentyl fluoride; and homologues and isomers of the described fluorides, such as the ethyl, dimethyl, and methylethyl homologues. Preferably, the cyclic fluoride should not have more than a total of 30 carbon atoms per molecule. The described fluorides having the fluorine atom attached to a carbon atom of the naphthene ring, and such fluorides are preferred. It is permissible, however, to have the fluorine atom attached to a carbon atom which in turn is attached to a carbon atom of the naphthene ring, such as fluoromethylcyclopentane, and such fluorides are included in the terms "cyclic fluoride" and "cycloalkyl fluoride." It is believed such fluorides form, under the conditions of the present process, carbonium ions identical to those of the preferred fluorides. It is also preferred to employ cyclohexyl fluorides, since the resulting alkylated cyclohexane product always contains an alkyl substituent having the same number of carbon atoms as the olefin. When a cyclopentyl fluoride is employed, one carbon atom is consumed in ring expansion to a 6 carbon atom ring, and the resulting cyclohexane product may exhibit more than one alkyl substituent derived from the olefin, but in both instances the total number of carbon atoms of the product equals the sum of the carbon atoms of the cyclic fluoride and olefin.

The present cyclic fluorides are conveniently prepared by adding hydrogen fluoride to the cyclic olefin corresponding to the desired cyclic fluoride. For example, adding hydrogen fluoride to cyclohexene gives cyclohexyl fluoride, and adding hydrogen fluoride to cyclopentene gives cyclopentyl fluoride, both of which fluorides are preferred components of the present process.

Olefins which may be employed in the present process are the non-cyclic mono-olefins having not more than about 20 carbon atoms per molecule. Preferred olefins to employ are ethylene, propene, butene-1, butene-2, isobutene, pentene-1, pentene-2, and isopentene, but good results are obtained with higher homologues and isomers thereof.

Although the mechanism of the present reaction is complicated, the overall reaction may be demonstrated by the following equation presented to illustrate the process and the principal products obtained, and which is not intended to show a carbon balance:

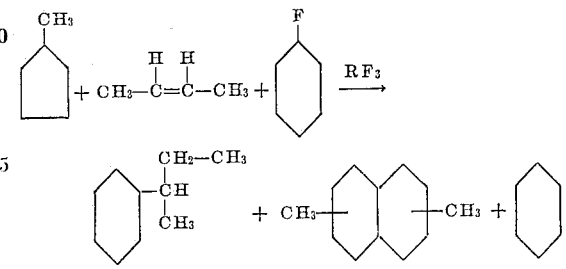

The 2-cyclohexylbutane product is the product of alkylation between the cyclohexyl fluoride and butene-2. The dimethyl-decalin product is a mixture of position and geometrical isomers and is formed by the dimerization of the methylcyclopentane. The cyclohexane, formed in small quantities, is the hydrocarbon corresponding to the cyclic fluoride. A minor quantity of a higher boiling material including dimethyldecalin alkylated with the olefin, is also obtained. Preferred reactants are used to illustrate the process; other reactants as above-defined give corresponding products. For example, if the naphthene has an additional substituent, it will appear as additional substituents on the decalin, while the other products will be the same as shown. Likewise, if the cyclohexyl fluoride has an alkyl substituent, the same substituent appears on the alkylated cyclohexane product in addition to the substituent corresponding to the olefin.

In carrying out the process of the present invention, the lowest operable temperature depends upon the cyclic fluoride employed. In the preferred case where the cyclic fluoride is a secondary fluoride, i. e., where the fluorine atom is attached to a secondary carbon atom, such as in cyclohexyl fluoride, the lowest operable temperature is −90° C. With a tertiary fluoride, i. e., where the fluorine atom is attached to a tertiary carbon atom, such as in 1-methylcyclohexyl fluoride, temperatures as low as −120° C. are operable. With a primary fluoride, such as fluoromethylcyclopentane, a temperature of at least −10° C. is required. Regardless of what fluoride is employed the process may be operated at temperatures up to 150° C., but preferably, in all cases, the temperature is maintained from 0° C. to 100° C. When the naphthene employed is normally a solid, a temperature sufficient to maintain it as a liquid, up to the described limit, is advantageously employed.

The concentrations of the reaction mixture components may be varied and good results obtained. The mole ratio of olefin to cycloalkyl fluoride may vary from 1:1 to 10:1 and is preferably 1:1 to 5:1; the mole ratio of the alkyl substituted cyclopentane to olefin may vary from 2:1 to 20:1; and the mole ratio of $BF_3$ to cycloalkyl fluoride may vary from 0.05:1 to 1:1. The quantity of $BF_3$ to employ is not critical, only a small amount, a catalytic quantity, being sufficient to initiate the reaction which then proceeds to completion. However, it is preferred to employ a somewhat larger quantity of $BF_3$ than is required to initiate the reaction, since the resulting reaction is then more sharply defined in the production of the desired products, i. e., the quantity of high boiling products is held to a minimum.

The present reaction is conducted in the liquid phase. The pressure to employ is advantageously that of the $BF_3$ at the temperature of the reaction. Operating at a temperature within the preferred range with a concentration of $BF_3$ within the preferred range, the pressure will be from about 100 to 200 p. s. i. g., but may vary from about 10 to 500 p. s. i. g.

The following example is presented to illustrate a specific embodiment of the present process, in which "parts" refers to parts by weight:

*Example*

A solution was prepared by dissolving 4.2 parts of $BF_3$ in 142 parts methylcyclopentane. To this solution was added a solution consisting of 24.1 parts of butene-2, 2.09 parts of cyclohexyl fluoride and 57.7 parts of methylcyclopentane. The mole ratio of butene-2 to cyclohexyl fluoride was 2.1, the mole ratio of methylcyclopentane to butene-2 was 5.55, and the mole ratio of $BF_3$ to cyclohexyl fluoride was 0.305. The temperature of reaction was 20° C. and the pressure about 100 p. s. i. g.

On mixing the two solutions the reaction occurred immediately, the pressure rapidly decreasing to about 10 p. s. i. g. A lower layer, consisting of 19.8 parts, separated out and was removed by decanting. The organic layer was washed, dried, and distilled. There were recovered 165 parts of methylcyclopentane containing a small quantity of cyclohexane, 16.5 parts of 2-cyclohexylbutane having a boiling point of about 186° C., and about 17 parts of the dimer of methylcyclopentane, dimethyldecalin, which was a mixture of position and geometrical isomers boiling from about 220° C. to 240° C. Also, about 7.6 parts of a higher boiling material, apparently largely dimethyldecalin alkylated with butene-2, were obtained.

The alkylated cyclohexane and decalins prepared in the present process are useful for the preparation of relatively pure aromatics by dehydrogenation, and for the preparation of other chemical compounds.

In patent application Serial No. 231,052, filed June 11, 1951, there is described and claimed the reaction of isoparaffins having at least 1 tertiary hydrogen atom per molecule to form alkyl substituted naphthenes by bringing together a cycloalkyl fluoride and $BF_3$ in the presence of the naphthene.

In patent application Serial No. 231,054, filed June 11, 1951, there is described and claimed the reactions of cyclopentanes having at least 1 tertiary hydrogen atom attached to a nuclear carbon atom by bringing together $BF_3$ and an alkyl fluoride in the presence of the naphthene to form polyalkyl naphthenes.

In patent application Serial No. 231,055, filed June 11, 1951, there is described and claimed the reactions between cyclopentanes having at least 1 tertiary hydrogen atom attached to a nuclear carbon atom and olefins, including cyclo-olefins, by bringing together $BF_3$ and an alkyl fluoride in the presence of a mixture of the cyclopentane and olefin to form branched chain paraffins and alkyl substituted naphthenes.

In patent application Serial No. 231,053, filed June 11, 1951, there is described and claimed the dimerization of cyclopentanes having at least 1 tertiary hydrogen atom attached to a nuclear carbon atom by bringing together $BF_3$ and cycloalkyl fluoride in the presence of the naphthene.

In patent application Serial No. 231,057, filed June 11, 1951, there is described and claimed the reactions between cyclopentanes having at least 1 tertiary hydrogen atom attached to a nuclear carbon atom and a cyclo-olefin by bringing together $BF_3$ and a cycloalkyl fluoride in the presence of a mixture thereof to form the alkylation product of the naphthene and cyclo-olefin and other hydrocarbons.

In patent application Serial No. 231,058, filed June 11, 1951, there is described and claimed the separation of naphthenes having a ring composed of 5 carbon atoms and at least 1 tertiary hydrogen atom attached to a nuclear carbon atom from naphthenes having a ring composed of 6 carbon atoms by bringing together in the presence of a mixture thereof $BF_3$ and an alkyl fluoride or a cycloalkyl fluoride.

The invention claimed is:

1. Method of alkylating an olefin with a cycloalkyl fluoride which comprises bringing together, in liquid homogeneous phase, $BF_3$ and a cycloalkyl fluoride in the presence of an olefin and a material selected from the group consisting of cyclopentanes having at least 1 alkyl substituent and at least 1 tertiary hydrogen atom attached to a nuclear carbon atom and an isoparaffin having at least 1 tertiary hydrogen atom, to effect instantaneous alkylation of said olefin with said cycloalkyl fluoride to produce an alkyl substituted cyclohexane.

2. Method of alkylating an olefin with a cycloalkyl fluoride which comprises bringing together, in liquid homogeneous phase, $BF_3$ and a cycloalkyl fluoride selected from the group consisting of cyclopentyl fluorides and cyclohexyl fluorides in the presence of an olefin and a material selected from the group consisting of cyclopentanes having at least 1 alkyl substituent and at least 1 tertiary hydrogen atom attached to a nuclear carbon atom and an isoparaffin having at least 1 tertiary hydrogen atom at a temperature sufficient to effect said alkylation by instantaneous reaction, said temperature being in the range of from −90° C. to 150° C.

3. Method of alkylating an olefin with a cyclopentyl fluoride which comprises bringing together, in liquid homogeneous phase, BF₃ and a cyclopentyl fluoride in the presence of an olefin and a cyclopentane having from 1 to 3 alkyl substituents and at least 1 tertiary hydrogen atom at a temperature sufficient to effect said alkylation by instantaneous reaction, said temperature being in the range of from −90° C. to 150° C., and separating from the reaction mixture the alkylation product of said olefin and said cyclopentyl fluoride.

4. Method of alkylating an olefin with a cyclohexyl fluoride which comprises bringing together, in liquid homogeneous phase, BF₃ and a cyclohexyl fluoride in the presence of an olefin and a cyclopentane having from 1 to 3 alkyl substituents and at least 1 tertiary hydrogen atom at a temperature sufficient to effect said alkylation by instantaneous reaction, said temperature being in the range of from −90° C. to 150° C.

5. Method according to claim 4 wherein a cyclohexane having an alkyl substituent containing the same number of carbon atoms as said olefin is separated from the reaction mixture 6. Method according to claim 4 wherein the olefin is ethylene.

7. Method according to claim 4 wherein the olefin is propene.

8. Method according to claim 4 wherein the olefin is butene-2.

9. Method according to claim 4 wherein the olefin is butene-1.

10. Method according to claim 4 wherein the olefin is isobutene.

11. Method of preparing 2-cyclohexylbutane which comprises bringing together, in liquid homogeneous phase, BF₃ and cyclohexyl fluoride in the presence of butene-2 and methylcyclopentane at a temperature of from −90° C. to 150° C., and separating 2-cyclohexylbutane from the reaction mixture.

12. Method of preparing 2-cyclohexylbutane which comprises introducing BF₃, in liquid homogeneous phase at a temperature of from −90° C. to 150° C., into an admixture of methylcyclopentane, butene-2, and cyclohexyl fluoride, wherein the mole ratio of butene-2 to cyclohexyl fluoride is from 1:1 to 10:1, the mole ratio of methylcyclopentane to butene-2 is from 2:1 to 20:1, and the mole ratio of BF₃ to cyclohexyl fluoride is from 0.05:1 to 1:1, and separating 2-cyclohexylbutane from the reaction mixture.

13. Process according to claim 12 wherein dimethyldecalin is separated from the reaction mixture.

UNITED STATES PATENTS

References Cited in the file of this patent

| Number | Name | Date |
|---|---|---|
| 2,413,384 | Schmerling | Dec. 31, 1946 |
| 2,434,289 | Schmerling | Jan. 13, 1948 |